United States Patent
Unno

(10) Patent No.: US 7,490,196 B2
(45) Date of Patent: Feb. 10, 2009

(54) DATA BACKUP USING BOTH TAPE AND DISK STORAGE

(75) Inventor: Satoshi Unno, Tokyo (JP)

(73) Assignee: NEC Corporation, Tokyo (JP)

( * ) Notice: Subject to any disclaimer, the term of this patent is extended or adjusted under 35 U.S.C. 154(b) by 259 days.

(21) Appl. No.: 10/320,513

(22) Filed: Dec. 17, 2002

(65) Prior Publication Data

US 2003/0159011 A1 Aug. 21, 2003

(30) Foreign Application Priority Data

Dec. 18, 2001 (JP) .............................. 2001-383915

(51) Int. Cl.
*G06F 12/02* (2006.01)
(52) U.S. Cl. ................... 711/111; 711/115; 711/165; 714/5; 714/7; 714/719
(58) Field of Classification Search ............... 714/5–6, 714/20, 28–29, 719; 707/204; 711/114, 711/4, 161, 162, 101, 115, 163, 111
See application file for complete search history.

(56) References Cited

U.S. PATENT DOCUMENTS

| | | | |
|---|---|---|---|
| 4,255,807 A | * | 3/1981 | Cosby .................. 714/718 |
| 4,549,295 A | * | 10/1985 | Purvis .................. 714/48 |
| 5,526,198 A | * | 6/1996 | Dodt et al. .................. 360/48 |
| 5,872,905 A | * | 2/1999 | Ono et al. .................. 714/5 |
| 6,226,202 B1 | * | 5/2001 | Kikuchi .................. 365/185.33 |
| 2003/0131191 A1 | * | 7/2003 | Zhang et al. .................. 711/113 |

FOREIGN PATENT DOCUMENTS

| | | | |
|---|---|---|---|
| JP | 05 035414 | * | 2/1993 |
| JP | H05-035414 A | | 2/1993 |
| JP | H05035414 | * | 2/1993 |
| JP | 6-214724 A | | 8/1994 |
| JP | 06 215444 | * | 8/1994 |
| JP | H06-215444 A | | 8/1994 |
| JP | H06215444 | * | 8/1994 |
| JP | H10-031564 A | | 2/1998 |
| JP | H10031564 | * | 2/1998 |

* cited by examiner

*Primary Examiner*—Sanjiv Shah
*Assistant Examiner*—Jesse Diller
(74) *Attorney, Agent, or Firm*—Sughrue Mion PLLC

(57) ABSTRACT

A magnetic tape apparatus for backup stores data provided from a computer on a magnetic tape. A writing circuit writes data provided from the computer on the magnetic tape, and switches a writing destination for data from the magnetic tape to a memory module when it is determined that data cannot be written on the magnetic tape, and writes address information and data following the data written on the magnetic tape onto the storage medium. The address information indicates a position on the magnetic tape where writing data should originally be written. A reading circuit determines a timing at which a reading source for data is switched from the magnetic tape to the storage medium according to the address information of data written on the memory module, and reads data from the magnetic tape to switch the reading source for data to the storage medium at the determined timing.

19 Claims, 10 Drawing Sheets

MAGNETIC TAPE BACKUP SYSTEM

MAGNETIC TAPE MT    MEMORY MODULE MM

DATA BACKUP USING BOTH TAPE AND DISK STORAGE

BACKGROUND OF THE INVENTION

1. Field of the Invention

The present invention relates to a data backup apparatus that executes data backup processing (including recording processing to a storage medium and reading and restoring processing from the storage medium) and data backup method.

2. Description of the Related Art

A magnetic tape backup apparatus records mass data processed by a computer on a magnetic tape and reproduces data from the magnetic tape to provide to the computer in response to a request from the computer. If the conventional magnetic tape backup apparatus fails in performing recording processing (processing for recording data on the magnetic tape) because of stains on the magnetic head and defects of the magnetic tape, all data recorded on the magnetic head so far are lost in many cases. The reason is that there are often used apparatuses that write catalogue information for backup on the last portion of the magnetic tape and apparatuses that determine a correct magnetic tape based on the fact that data recording is normally ended. Accordingly, in order to prevent such a data loss, a process for backing up data on the magnetic tape must be ended normally.

In order to prevent from "failure in backup processing", there exists a system in which backup processing is started after the magnetic head is cleaned. However, even if this method is adopted, there is a case in which damage occurs on the magnetic tape by solids on the magnetic head due to influences of magnetic powder from the magnetic tape and dust from the external section, so that a recording error is generated.

In addition, Unexamined Japanese Patent Application KOKAI Publication H06-214724 discloses a technique for inputting/outputting information to other mass storage from an IC memory using both a magnetic tape apparatus and an IC memory card at high speed. However, this is not the technique for preventing the omission of recording data at data backup processing and for eliminating time waste in re-execution of backup processing due to the recording error.

SUMMARY OF THE INVENTION

The present invention has been made with consideration given to the aforementioned circumstances, and an object of the present invention is to prevent data loss due to failure in backup processing.

Moreover, another object of the present invention is to provide a data backup apparatus capable of eliminating time waste in backup processing due to failure in data backup processing.

In order to attain the above object, a magnetic tape apparatus according to a first aspect of the present invention stores data provided from an external device such as a computer onto a magnetic tape includes a magnetic tape access device that has a magnetic tape attachably and detachably set (inserted) thereto and gains access to the set magnetic tape. The magnetic tape apparatus further includes a storage medium access device that has a storage medium attachably and detachably set thereto and gains access to the set storage medium. The magnetic tape apparatus further includes a writing circuit that writes data provided from the external device on the magnetic tape by controlling the magnetic tape access device. The writing circuit of the magnetic tape apparatus switches a writing destination for the data from the magnetic tape to the storage medium when it is determined that data cannot be written on the magnetic tape. Moreover, in this case, the writing circuit writes address information and data following the data written onto the magnetic tape onto the storage medium by controlling the storage medium access device. The address information indicates a position on the magnetic tape where the data originally should be written.

The writing circuit may switch the writing destination for data from the magnetic tape to the storage medium regardless of a residual amount of the magnetic tape when it is determined that data cannot be written on the magnetic tape.

The magnetic tape apparatus may further comprises a reading destination determining circuit which determines timing at which a reading source for data is switched from the magnetic tape to the storage medium according to the address information of data written on the storage medium when data is read from the magnetic tape and storage medium set to said magnetic tape access device and said storage medium access device, respectively; and a reading circuit that reads data from the magnetic tape by controlling said magnetic tape access device, switches the reading destination for data to the storage medium at the timing determined by said reading destination determining means, and reads data, following data read from the magnetic tape, from the storage medium.

The writing circuit may execute re-writing of data when data written on the magnetic tape is read by said reading circuit and this data does not match the data from the external device, and said writing circuit determines that data cannot be written when normal writing cannot be performed even when data re-writing is executed a predetermined number of times.

The writing device may determine the presence or absence of the residual writable area of the storage medium during data writing onto the storage medium, and urges a user to exchange the attached magnetic tape or storage medium for a new magnetic tape or storage medium when determining the absence of the writable area.

The reading device may determine whether data is read from the entire readable area of the storage medium during data reading from the storage medium, and urge a user to exchange the attached magnetic tape or storage medium for a magnetic tape or storage medium on which continuing data is written when determining that data is read from the entire readable area.

The magnetic tape access device may include a magnetic head, and the storage medium access device may include an interface circuit. Moreover, the storage medium may include a memory module, where the memory module is attached to the interface circuit.

The writing circuit may generate writing data in a predetermined format, allocate an address to each data unit, and provide the allocated address to said magnetic tape access device and storage medium access device.

Each of said writing circuit and said reading circuit may include a communication interface, a buffer, and a compression circuit. In this case, for example, at a writing operation, data provided from the external device is received by the communication interface, received data is stored in the buffer, data stored in the buffer is compressed by the compression circuit, and compressed data is provided to said magnetic tape access device and storage access device; at a reading operation, data read from said magnetic tape access device and storage medium access device is decompressed by the compression circuit, decompressed data is stored in the buffer, and data is read from the buffer to be provided to the external device.

In order to achieve the object, a magnetic tape apparatus of the second aspect of the present invention comprises:

magnetic tape access means for having a magnetic tape attachably and detachably set thereto and for gaining access to the set magnetic tape;

storage medium access means for having a storage medium attachably and detachably set thereto and for gaining access to the set storage medium; and a writing circuit that writes data provided from the external device on the magnetic tape by controlling said magnetic tape access means, and switches a writing destination for data from the magnetic tape to the recording medium when it is determined that data cannot be written on the magnetic tape, and writes address information, which indicates a position on the magnetic tape where writing data should be originally written together with data following data written on the magnetic tape, onto the recording medium by controlling said storage medium access means.

The magnetic tape apparatus may further comprises: reading destination determining circuit for determining a timing at which to switch a reading source for data from the magnetic tape to the storage medium according to the address information of data written on the storage medium when data is read from the magnetic tape and storage medium set to said magnetic tape access means and said storage medium access means, respectively; and reading means for reading data from the magnetic tape by controlling said magnetic tape access means, switches the reading destination for data to the storage medium at the timing determined by said reading destination determining circuit, and reads data from the storage medium following data read from the magnetic tape.

In order to achieve the object, a magnetic tape reproduction device of the third aspect of the present invention comprises:

magnetic tape access means for having a magnetic tape attachably and detachably set thereto and for gaining access to the set magnetic tape;

storage medium access means for having a storage medium attachably and detachably set thereto and for gaining access to the set storage medium;

reading destination determining means for determining timing at which a reading source for data is switched from the magnetic tape to the storage medium according to address information of data written on the storage medium;

reading means for reading data from the magnetic tape by controlling said magnetic tape access means, switches the reading destination for data to the storage medium at the timing determined by said reading destination determining means, and reads data following data read from the magnetic tape from the storage medium.

In order to attain the above object, a data backup method according to a fourth aspect of the present invention includes the step of writing data to be sequentially provided on a magnetic tape, sequentially. The data backup method further includes switching a writing destination for the data from the magnetic tape to a storage medium when it is determined that data cannot be written on the magnetic tape so as to write address information, which indicates a position on the magnetic tape where writing data should be originally written together with data, following data written on the magnetic tape, onto the recording medium.

The data backup method may further comprising the steps of: determining timing at which a reading source for data is switched from the magnetic tape to the storage medium according to the address information of data written on the storage medium; and reading data from the magnetic tape to switch the reading source for data at the timing determined by said reading destination determining method and to read data, following data read from the magnetic tape, from the storage medium.

In order to attain the above object, a backup data reproduction method according to a fifth aspect of the present invention includes:

determining timing at which a reading source for data is switched from the magnetic tape to the storage medium according to address information of data written on the storage medium; and reading data from the magnetic tape to switch the reading source for data at the timing determined by said reading destination determining method and to read data, following data read from the magnetic tape, from the storage medium.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Figure 1:
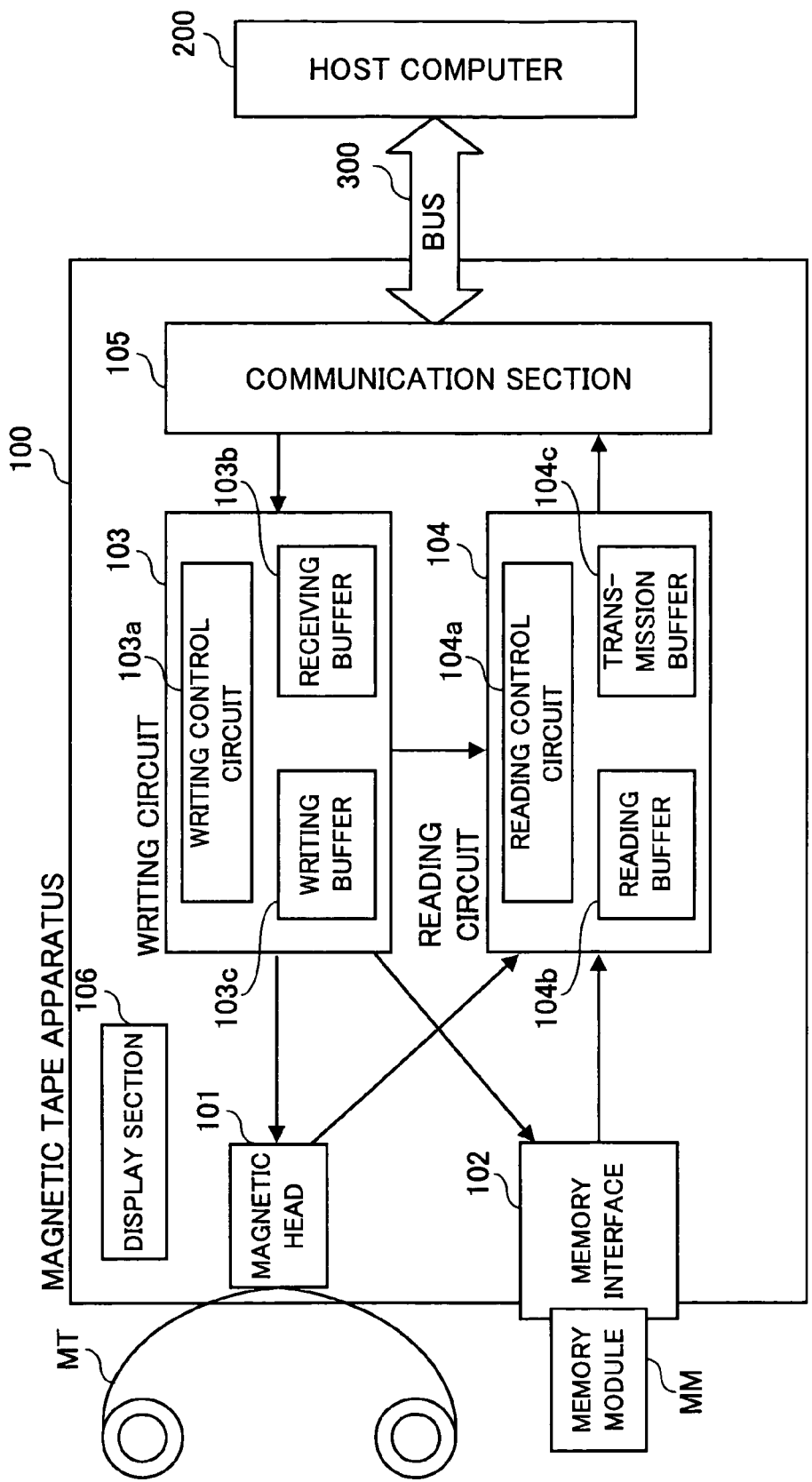
FIG. 1 is a block diagram showing the structure of a magnetic tape backup system according to a first embodiment of the present invention.

The following will specifically explain embodiments of the present invention with reference to the drawings.

(1) First Embodiment

A magnetic tape backup system according to a first embodiment of the present invention includes a magnetic tape apparatus 100, a host computer 200, and a bus 300 interconnected to these components.

The host computer 200 transmits data to be stored (backed up) on a magnetic tape, etc., to the magnetic tape apparatus 100 via the bus 300. Moreover, the host computer 200 receives data restored from a storage medium such as a magnetic tape, etc., from the magnetic tape apparatus 100 via the bus 300.

The magnetic tape apparatus 100 includes a magnetic head 101, a memory interface 102, a writing circuit 103, a reading circuit 104, a communication section 105, and a display section 106.

The magnetic head 101 includes a rotation head (not shown), etc., and is controlled by the writing circuit 103 and reading circuit 104 to execute data writing/reading onto/from the magnetic tape MT. A transfer mechanism that transfers the magnetic tape MT is also provided.

The memory interface 102 has a memory module MM that is attachable and detachable to/from, for example, a flash memory card. The memory interface 102 is controlled by the writing circuit 103 and reading circuit 104 to execute data writing/reading onto/from the attached memory module MM.

The writing circuit 103 receives data (data subjected to backup), which is sent from the host computer 200 and which is to be stored to the magnetic tape MT. The writing circuit 103 compresses received data and writes compressed data to the magnetic tape MT. When it is detected that an error occurs in writing data on the magnetic tape MT, the writing circuit 103 writes compressed data to the memory module MM via the memory interface 102.

More specifically, the writing circuit 103 includes a writing control circuit 103a, a receiving buffer 103b, and a writing buffer 103c. Data, which is sent from the host computer 200 and which is to be stored to the magnetic tape MT, is sequentially stored to the receiving buffer 103b from the communication section 105. The writing control circuit 103a reads data from the receiving buffer 103b and compresses read data. The writing control circuit 103a adds header information (group) and address information to compressed data to generate writing data (group) with a structure (format) shown in FIG. 6, and stores generated data to the writing buffer 103c. The writing control circuit 103a sequentially reads data stored in the writing buffer 103c and read data is written on the magnetic tape MT by the magnetic head 101. When it is detected that an error occurs in writing data on the magnetic tape MT, the writing control circuit 103a changes a destination to which writing data is provided to the memory interface 102.

The reading circuit 104 reads data stored in the magnetic tape MT, etc., in response to a request from the host computer 200, and restores original data from read data and transmits restored data to the host computer 200. Moreover, the reading circuit 104 reads data stored in the memory module MM among backed-up data from the memory module MM via the memory interface 102.

More specifically, the reading circuit 104 includes a reading control circuit 104a, a reading buffer 104b, and a transmission buffer 104c.

Figure 6:
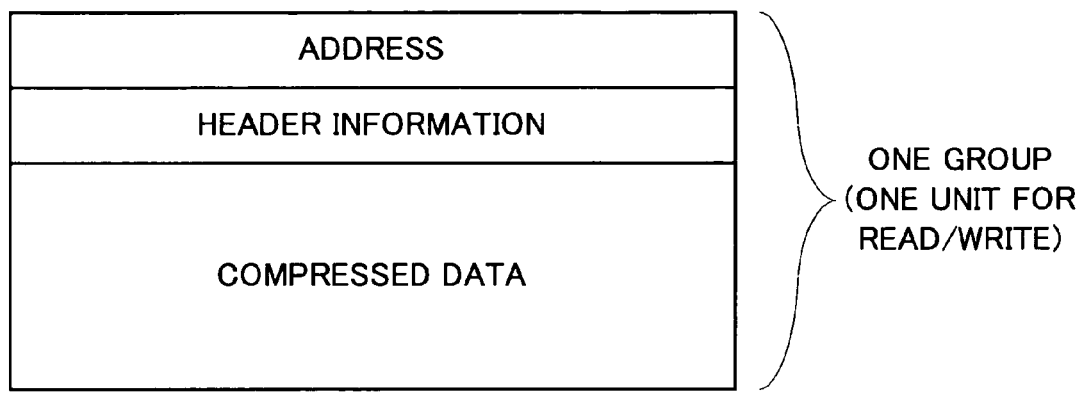
FIG. 6 is a view schematically showing the structure of data to be recorded on the magnetic tape.

The reading control circuit 104a reads data stored in the magnetic tape MT, etc., in response to a request from the host computer 200, and stores it to the reading buffer 104b. The reading control circuit 104a sequentially reads data from the reading buffer 104b and restores original data from read data, and stores restored data to the transmission buffer 104c. Namely, data (group) stored in the reading buffer 104b has the structure as shown in FIG. 6. The reading control circuit 104a reads data (group) in order of address and removes the address and header information to extract compressed data. The reading circuit 104a further decompresses compressed data and stores it to the transmission buffer 104c. The communication section 105 sequentially reads data stored in the transmission buffer 104c, and transmit it to the host computer 200. The reading control circuit 104a reads data stored in the memory module MM among backed-up data from the memory module MM via the memory interface 102, and stores read data to the reading buffer 104b.

The communication section 105 stores backing-up data to be supplied from the host computer 200 to the receiving buffer 103b and reads data stored in the transmission buffer 104c, and transmits it to the transmission buffer 104c.

The display section 106 is composed of an LED display device, a lamp display device, or a liquid crystal display device, etc. The display section 106 displays various kinds of information.

The following will explain the operation of the entire magnetic tape data backup system according to this embodiment with reference to the drawings.

Figure 2:
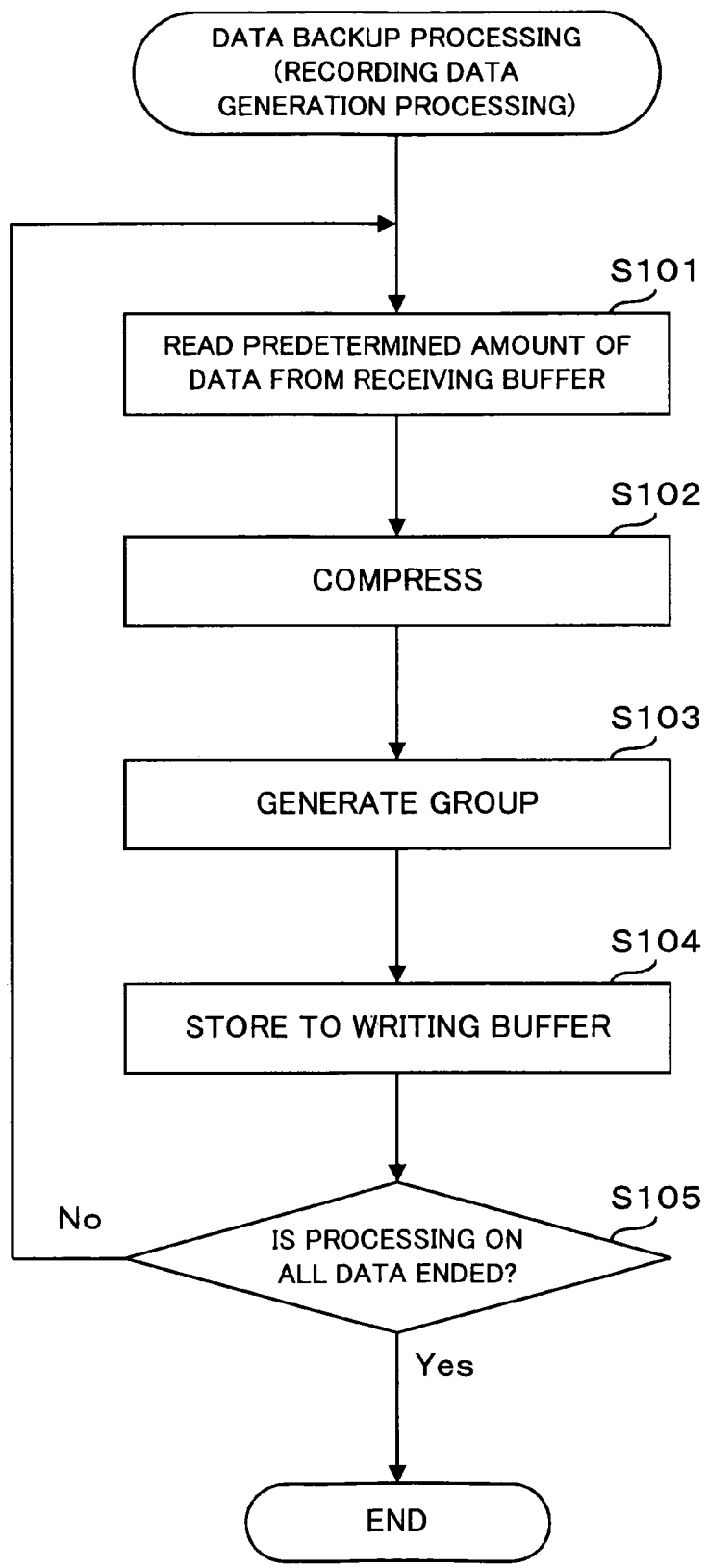
FIG. 2 is a flowchart for explaining an operation of the magnetic tape data backup system shown in FIG. 1, and a process for generating data to be recorded on a magnetic tape.

First, an explanation will be given of data backup processing in which the magnetic tape apparatus 100 writes data sent from the host computer 200 on the magnetic tape MT with reference to the flowcharts of FIGS. 2 to 4.

In addition, it is assumed that the magnetic tape MT and memory module MM are provided to the magnetic head 101 and memory interface 102 respectively before this data backup processing is executed.

First of all, the communication section 105 provided in the magnetic tape apparatus 100 receives data (data to be backed up) sequentially transmitted from the host computer 200 via the bus 300, and stores received data to the receiving buffer 103b, sequentially.

The writing control circuit 103a reads data from the receiving buffer 103b to generate data (group) to be written, and stores generated data to the writing buffer 103c, sequentially. This operation will be explained with reference to the flowchart of FIG. 2.

The writing control circuit 103a reads a fixed amount of data from the receiving buffer 103b (step S101), and compresses read data (step S102). The writing control circuit 103a adds an address and a header to compressed data to generate data (group) to be used as a writing unit of the structure conceptually shown in FIG. 6 (step S103).

The writing control circuit 103a accumulates generated data (group) to be written in the writing buffer 103c (step S104).

The writing control circuit 103a determines whether processing on all data to be backed up is ended (step S105). If processing is ended (step S105; Yes), processing is ended. While, unprocessed data is left (step S105: No), processing returns to step S101 and processing on next data is continued.

The writing control circuit 103a sequentially reads data stored in the writing buffer 103c in parallel with processing for writing data to the writing buffer 103c on a group basis and writes read data on the magnetic tape MT via the magnetic head 101.

This data writing processing will be explained with reference to the flowchart of FIG. 3.

First, the writing control circuit 103a reads data for one group from the writing buffer 103c (step S201).

Next, the writing control circuit 103a writes read data for one group on the magnetic tape MT (step S202).

After that, the writing control circuit 103a determines whether an error occurs in writing data on the magnetic tape MT (step S203). For example, the writing control circuit 103a reads written data from the reading circuit 104 and compares read data with original data (performs verification). If both do not match (failure in verification), the writing control circuit 103a performs rewriting. If the writing control circuit 103a fails in the rewriting, the writing control circuit 103a determines that an error occurs in writing data. In addition, when the writing control circuit 103a executes the verification operation n times maximum (n is a natural number of two or more) and does not write data normally, the writing control circuit 103a may determine that "recovery-difficult writing error occurs."

When determining that an error occurs (step S203; YES), the writing control circuit 103a executes error processing (step S207) as shown the flowchart of FIG. 4 to be described later.

When determining that no error occurs (step S203; NO), the writing control circuit 103a determines whether all data to be backed up is written on the magnetic tape MT (step S204).

When determining that all data to be backed up is written on the magnetic tape MT (step S204; YES), the writing control circuit 103a ends processing.

While, when determining that there is remaining data that is not written on the magnetic tape MT (step S204; NO), the writing control circuit 103a determines whether data is written on the entire writable area of the magnetic tape MT (the magnetic tape MT is used up) (step S205).

When determining that data is not written on the entire writable area of the magnetic tape MT (writable area is left) (step S205; YES), the writing control circuit 103a returns processing to the aforementioned step S201 and continues writing data to be backed up on the magnetic tape MT.

While, when determining that data is written on the entire writable area of the magnetic tape MT (step S205; NO), the writing control circuit 103a executes predetermined magnetic tape exchange preparation processing (step S206). More specifically, the writing control circuit 103a performs control as shown in the following Sa to Sc in order to urge a user to exchange the magnetic tape MT.

Sa: Return an error code, which indicates that there is no writable area of the magnetic tape MT, to the host computer 200 via the bus 300.

Sb: Separate the magnetic tape MT from the magnetic head 101 to make it possible to detach the magnetic tape MT from the magnetic tape apparatus 100.

Sc: Display a notice, which indicates that the switch in the magnetic tape MT is needed, (notice that urges the user to exchange the magnetic tape) on the display section 106.

As a result of control Sa to Sc, when recognizing that the magnetic tape MT is exchanged by the user, the writing control circuit 103a returns processing to the aforementioned step S201 to continue writing data to be backed up on a new magnetic tape MT.

In data backup processing, the aforementioned steps S201 to S206 are repeatedly executed. Then, when all data to be backed up is written on the magnetic tape MT (step S204; YES), the writing control circuit 103a ends data backup processing. In addition, the writing control circuit 103a writes catalogue information for backup and information indicative of final data on the magnetic tape MT as required.

Figure 4:
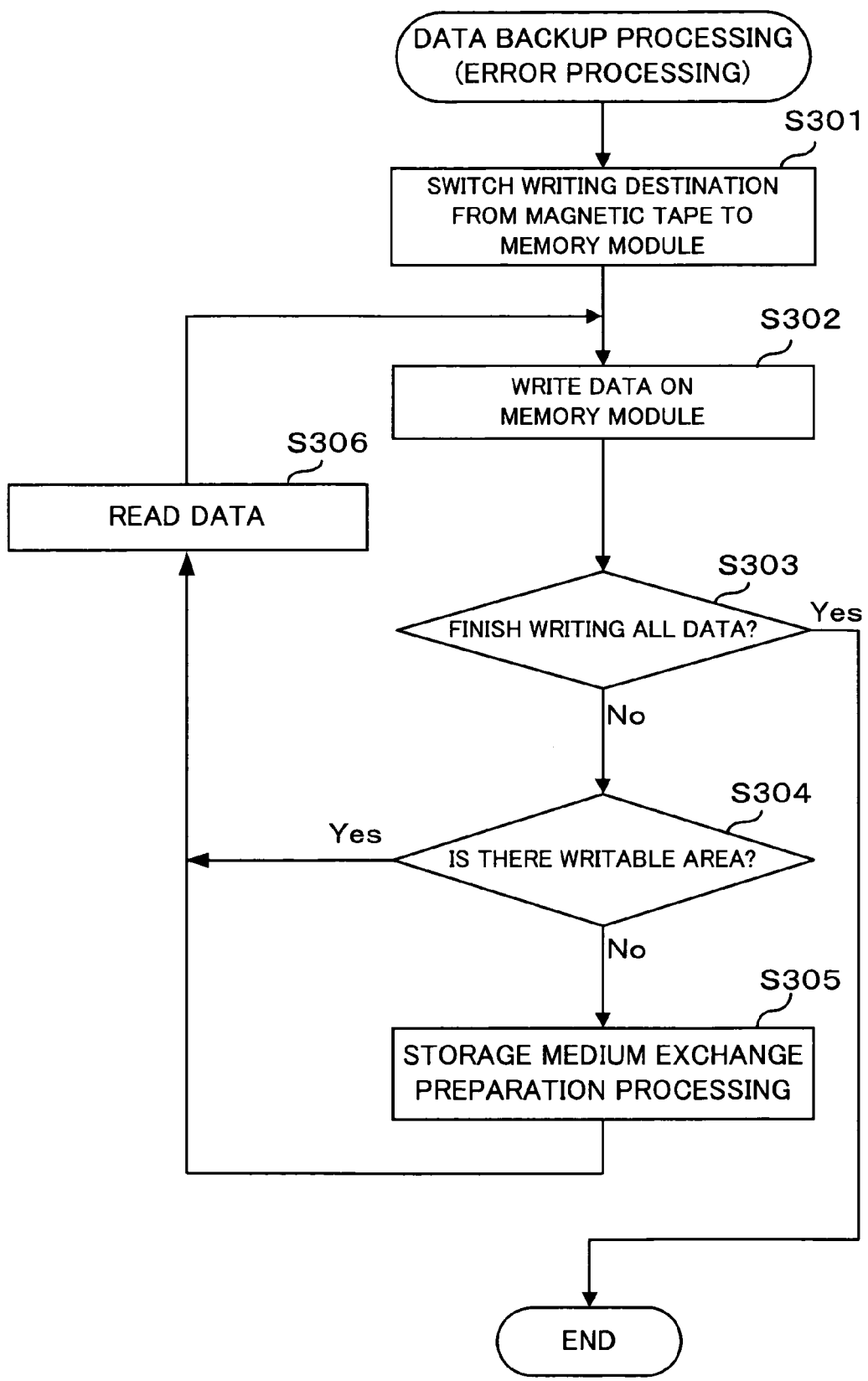
FIG. 4 is a flowchart for explaining the operation of the magnetic tape data backup system shown in FIG. 1, and a process for recording the following data on a memory module when an error is generated in the process of recording data on the magnetic tape.

Sequentially, the following will explain error processing (step S207) that is executed by the magnetic tape apparatus 100 when an error occurs during data backup processing onto the magnetic tape MT with reference to the flowchart of FIG. 4.

Figure 3:
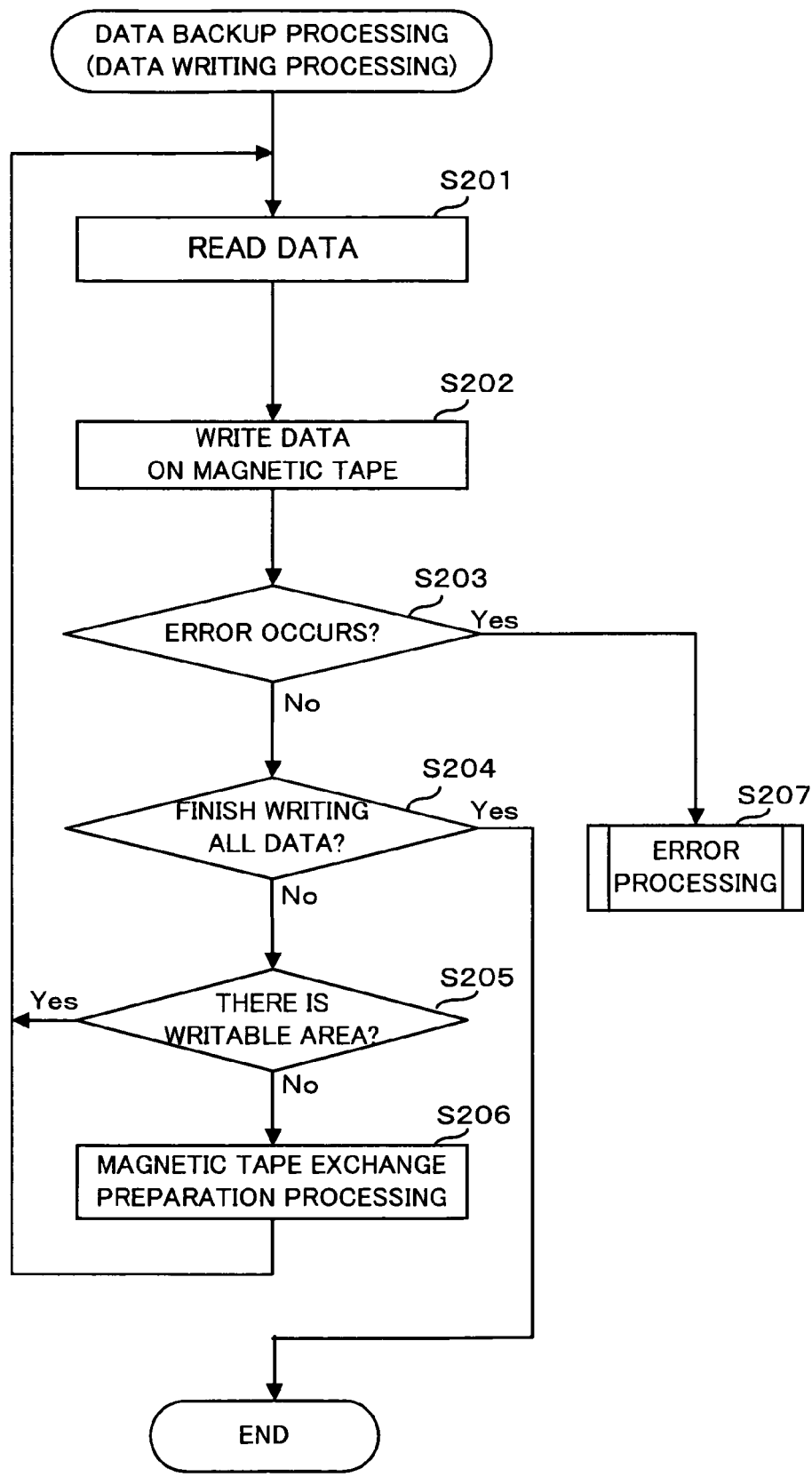
FIG. 3 is a flowchart for explaining the operation of the magnetic tape data backup system shown in FIG. 1, and a process for generating data to be recorded on the magnetic tape.

When the writing control circuit 103a fails in writing data on the magnetic tape MT and determines that an error occurs (step S203 of FIG. 3; YES), the writing control circuit 103a switches a supply destination for data from the magnetic head 101 to the memory interface 102, and a writing destination for data from the magnetic tape MT to the memory module MM (FIG. 4; step S301).

When data can not be recorded on the magnetic tape MT, the writing control circuit 103a writes data to be written on the memory module MM (step S302).

After that, the writing control circuit 103a determines whether all data to be backed up is written on the magnetic tape MT or memory module MM (step S303).

When determining that all data to be backed up is written on the magnetic tape MT or memory module MM (step S303; YES), the writing control circuit 103a ends processing. In addition, the writing control circuit 103a writes catalogue information for backup and information indicative of final data on the memory module MM as required.

While, when determining that writing is not completed yet (unwritten data is left) (step S303; NO), the writing control circuit 103a determines whether data is written on the entire writable area of the memory module MM (whether the memory module is used up) (step S304).

When determining that data is not written on the entire writable area of the memory module MM (writable storage area is left) (step S304; YES), the writing control circuit 103a reads next writing data from the writing buffer 103c (step S306) and returns processing to the aforementioned step S302 to continue writing data.

While, when determining that data is written on the entire writable area of the memory module for backup (step S304; NO), the writing control circuit 103a executes memory module exchange preparation processing (step S305). More specifically, the writing control circuit 103a performs control as shown in the following Ta to Tc in order to urge a user to exchange the memory module MM.

Ta: Return an error code, which indicates that there is no writable area in the memory module MM, to the host computer 200 via the bus 300. In addition, this error code may be the same code as "a code indicating that there is no writable area in the magnetic tape" that is issued in the aforementioned data backup processing (step S207).

Tb: Make it possible to detach the memory module MM from the memory interface 102.

Tc: Display the fact that the exchange of the memory module MM becomes impossible (notice that urges the user to exchange the storage medium) on the display section 106.

As a result of control Ta to Tc, when recognizing that the memory module MM is exchanged by the user, the writing control circuit 103a returns processing to the aforementioned step S306 to continue processing for writing the following data on the module memory MM.

While, determining that all data is written on the magnetic tape MT or memory module MM (step S303; YES), the writing control circuit 103a ends processing.

Thus, in error processing, the writing control circuit 103a executes the aforementioned steps S301 to S306 repeatedly. Then, when all data to be backed up is written on the memory module MM, the writing control circuit 103a ends error processing. In addition, the writing control circuit 103a writes catalogue information and information indicative of final data on the memory module MM as required.

Figure 7:
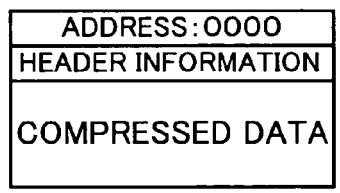
FIG. 7 is a view schematically showing the state in which data is continuously recorded on the magnetic tape and memory module.
Figure 7:
Figure 7:
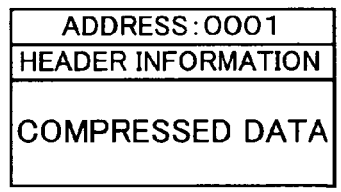
Figure 7:
Figure 7:
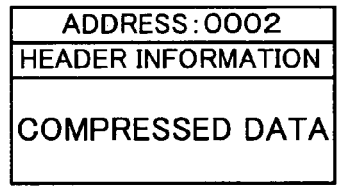
Figure 7:
Figure 7:
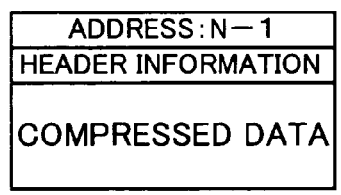
Figure 7:
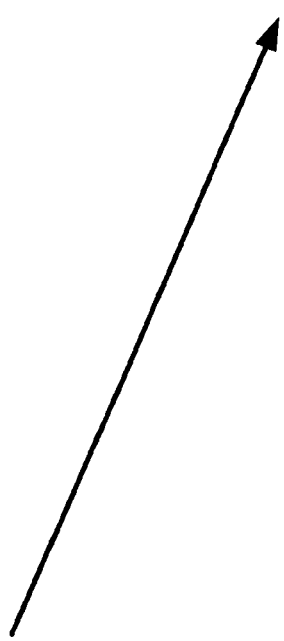
Figure 7:
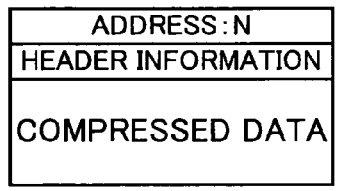
Figure 7:
Figure 7:
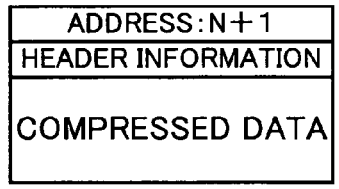
Figure 7:
Figure 7:
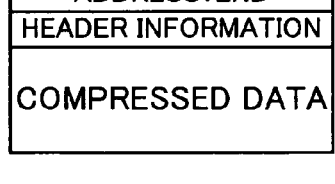

An explanation will be next given of the aforementioned data backup processing based on a specific example with reference to FIG. 7.

First, the communication section 105 sequentially stores data, which is sent in order from the host computer 200, to the receiving buffer 103b.

The writing control circuit 103a reads a fixed amount of data from the receiving buffer 103b (step S101), and compresses read data (step S102). The writing control circuit 103a adds an address and a header to compressed data to generate groups of addresses of "0000", "0001", . . . sequentially (step S103).

The writing control circuit 103a accumulates generated data (group) to be written in the writing buffer 103c (step S104).

The writing control circuit 103a sequentially reads data stored in the writing buffer 103c in parallel with processing for writing data to the writing buffer 103c on a group basis (step S201) and writes read data on the magnetic tape MT (step S202). As a result, groups of addresses of "0000", "0001", . . . are sequentially recorded on the magnetic tape MT as shown in FIG. 7.

Here, it is assumed that a recovery-difficult writing error occurs when a group of address "n" is written on the magnetic tape MT after writing a group of address "n−1" on the magnetic tape MT normally. Then, the writing control circuit 103a detects a writing error in step S203 and switches a writing destination for data from the magnetic tape MT to the memory module MM (step S301). After that, the writing control circuit 103a writes data on the memory module MM in order from the group of address "n" at which the writing error occurs (step S302). Then, the writing control circuit 103a ends processing when determining that all data to be backed up is written on the magnetic tape MT or memory module MM (step S303; YES).

By the aforementioned backup processing, all data to be backed up is written on the storage media (magnetic tape MT and memory module MM) with continuity. Accordingly, it is possible to prevent from data loss resulting from failure in data backup processing in the magnetic tape apparatus.

(Data Restoring Operation)

Figure 5:
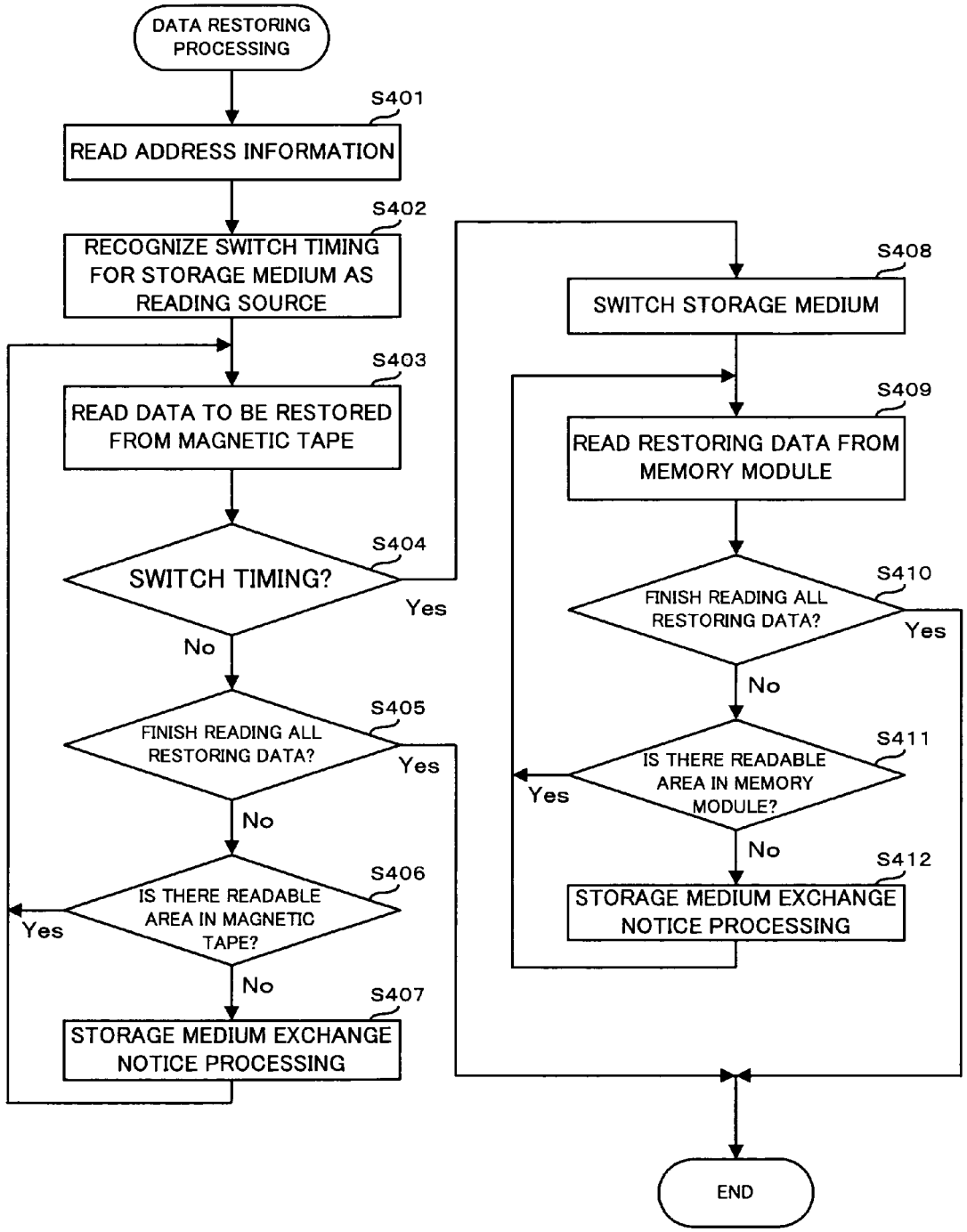
FIG. 5 is a flowchart for explaining the operation of the magnetic tape data backup system shown in FIG. 1, and a process for restoring data recorded on the magnetic tape and/or memory module.

An explanation will be next given of processing in which the magnetic tape apparatus 100 reads backed-up data from the storage medium and read data is transmitted to the host computer 200 with reference to the flowchart of FIG. 5.

First, it is assumed that the magnetic tape MT and memory module MM at an error generating time in data backup processing are attached to the magnetic head 101 and memory interface 102, respectively.

The reading control circuit 104a first reads address information of each group stored in the memory module MM via the memory interface 102 (step S401).

The reading control circuit 104a distinguishes between a range (portion) where data is stored on the magnetic tape MT and a range (portion) where data is stored onto the memory module MM based on read address information among all data (data to be restored) stored in the storage media (magnetic tape MT and memory module MM). The reading control circuit 104a thereby recognizes "timing (switch timing) at which the storage medium, which serves as a reading source for data to be restored, is switched from the magnetic tape MT to the memory module MM" (step S402).

The reading control circuit 104a reads data to be restored from the magnetic tape MT via the magnetic head 101, and writes read data to the reading buffer 104b (step S403). After that, data of each group stored in the reading buffer 104b is decompressed and written to the transmission buffer 104c. The communication section 105 transmits data stored in the transmission buffer 104c to the host computer 200 via the bus 300, sequentially.

The reading control circuit 104a determines whether timing reaches "timing at which an access destination is switched from the magnetic tape MT to the memory module MM" recognized in step S402 (step S404).

The reading control circuit 104a determines whether all data to be restored is read (step S405) when determining that timing does not reach the above switch timing (step S404; NO). The reading control circuit 104a ends data restoring processing when determining that all data to be restored is read (step S405; YES).

While, when determining that all data to be restored is not read (data to be restored is left) (step S405; NO), the reading control circuit 104a determines whether data is read from the entire readable area of the magnetic tape MT (step S406).

When determining that all data is not read from the entire readable area of the magnetic tape MT (data to be read is left) (step S406; YES), the reading control circuit 104a returns processing to step S403 to continue reading data to be restored.

While, when determining that data is read from the entire readable area of the magnetic tape MT (step S406; NO), the reading control circuit 104a executes storage medium exchange notice processing (step S407). More specifically, the reading control circuit 104a performs control as shown in the following Ua to Uc in order to urge a user to exchange the current magnetic tape MT for a magnetic tape MT on which data, which following data restored so far, is written.

Ua: Return an error code, which indicates that data is read from the entire readable area, to the host computer 200 via the bus 300. This error code may be the same code as a code indicating that "data is read from the entire area of the magnetic tape" at a normal time.

Ub: Make it possible to detach the magnetic tape MT.

Uc: Display a notice that a switch in the magnetic tape MT is needed on the display section 106.

As a result of control Ua to Uc, when recognizing that the magnetic tape is exchanged by the user, the reading control circuit 104a returns processing to the aforementioned step S403 to continue reading data to be restored to the reading buffer 104b from a new magnetic tape MT.

While, in step S404, when determining that timing reaches "switch timing" (step S404; YES), the reading control circuit 104a switches a reading source for data to be restored from the magnetic tape MT to the memory module MM (step S408).

Afterward, the reading control circuit 104a reads data from the memory module MM via the memory interface 102 on a group basis, and writes read data to the reading buffer 104b (step S409). Then, the reading control circuit 104a extracts compressed data from each group stored in the reading buffer 104b and decompresses extracted data and writes decompressed data to the transmission buffer 104c. The communication section 105 transmits data stored in the transmission buffer 104c to the host computer 200 via the bus 300, sequentially.

The reading control circuit 104a determines whether all data to be restored is read (step S410). When determining that all data to be restored is read (step S410; YES), the reading control circuit 104a ends data restoring processing.

While, when determining that all data to be restored is not read (data to be restored is left) (step S410; NO), the reading control circuit 104a determines whether data is read from the entire readable area of the memory module MM (step S411).

When determining that all data is not read from the entire readable area of the memory module MM (data to be read is left) (step S411; YES), the reading control circuit 104a returns processing to step S409 to continue reading data to be restored.

While, when determining that data is read from the entire readable area of the memory module MM (data to be read is not left) (step S411; NO), the reading control circuit 104a executes storage medium exchange notice processing (step S412). More specifically, the reading control circuit 104a performs control as shown in the following Va to Vc in order to urge a user to exchange the storage medium for a storage medium on which data, which follows restored data read so far, is written.

Va: Return an error code, which indicates that data is read from the entire readable area, to the host computer 200 via the bus 300. This error code may be the same code as a code indicating that "data is read from the entire area of the magnetic tape" at a normal time.

Vb: Make it possible to detach the memory module MM.

Vc: A notice that a switch in the memory module MM is needed is provided to the user.

As a result of control Va to Vc, when recognizing that the memory module MM is exchanged, the reading control circuit 104a returns processing to the aforementioned step S409 to read data to be restored to the reading buffer 104b from a new memory module MM.

Then, the reading control circuit 104a ends processing when determining that all data to be restored is read in step S410.

A detailed explanation will be next given of the aforementioned operation with reference to FIG. 7 as an example.

First, the reading control circuit 104a reads address information "n" to "end" of each group stored in the memory module MM via the memory interface 102 (step S401). The reading control circuit 104a distinguishes between groups at addresses "0000" to "n−1", which are recorded on the magnetic tape MT, and groups at addresses "n" to "end", which are recorded on the memory module MM, based on read address information. The reading control circuit 104a thereby recognizes that "timing (switch timing) at which a reading source for data to be restored is switched from the magnetic tape MT to the memory module MM" is time after the group at address n−1 is read (step S402).

The reading control circuit 104a reads data of groups at addresses "0000" to "n−1" from the magnetic tape MT via the magnetic head 101 and writes read data to the reading buffer 104b (step S403). After that, the reading control circuit 104a decompresses compressed data of each group stored in the reading buffer 104b and writes decompressed data to the transmission buffer 104c. The communication section 105 transmits data stored in the transmission buffer 104c to the host computer 200 via the bus 300, sequentially.

When reading data of the group at address "n−1" from the magnetic group MT, the reading control circuit 104a determines that timing reaches "switch timing" (step S404; YES) and switches the medium to be read from the magnetic tape MT to the memory module MM (step S408).

Afterward, the reading control circuit 104a reads data from the memory module MM via the memory interface 102 on a group basis via the memory interface 102, and writes read data to the reading buffer 104b (step S409). Then, the reading control circuit 104a decompresses compressed data of each group stored in the reading buffer 104b and writes decompressed data to the transmission buffer 104c. The communication section 105 transmits data stored in the transmission buffer 104c to the host computer 200 via the bus 300, sequentially.

When reading the group at address "end", the reading control circuit 104a determines that all data is read (step S410; YES).

By executing the aforementioned data restoring processing, restoring data recorded on the magnetic tape MT and memory module MM are restored without losing continuity. This is because address information, which directly or indirectly indicates on which position on the magnetic tape MT data should be originally written, is written on the memory module MM together with data to be restored.

Modification

In the aforementioned first embodiment, for example, in error processing, when it is determined that the memory module MM is full (step S304; NO), the medium may be exchanged for the magnetic tape MT at the time of exchanging the medium.

Processing in this case will be explained with reference to the flowchart of FIG. 8.

In this case, the following processing is carried out in storage medium exchange preparation processing of step S305.

Wa: Return an error code, which indicates that data is read from the entire readable area, to the host computer 200 via the bus 300.

Wb: Make it possible to detach the magnetic tape MT and the memory module MM.

Wc: A notice that a switch in the medium is possible is given to the user.

Figure 8:
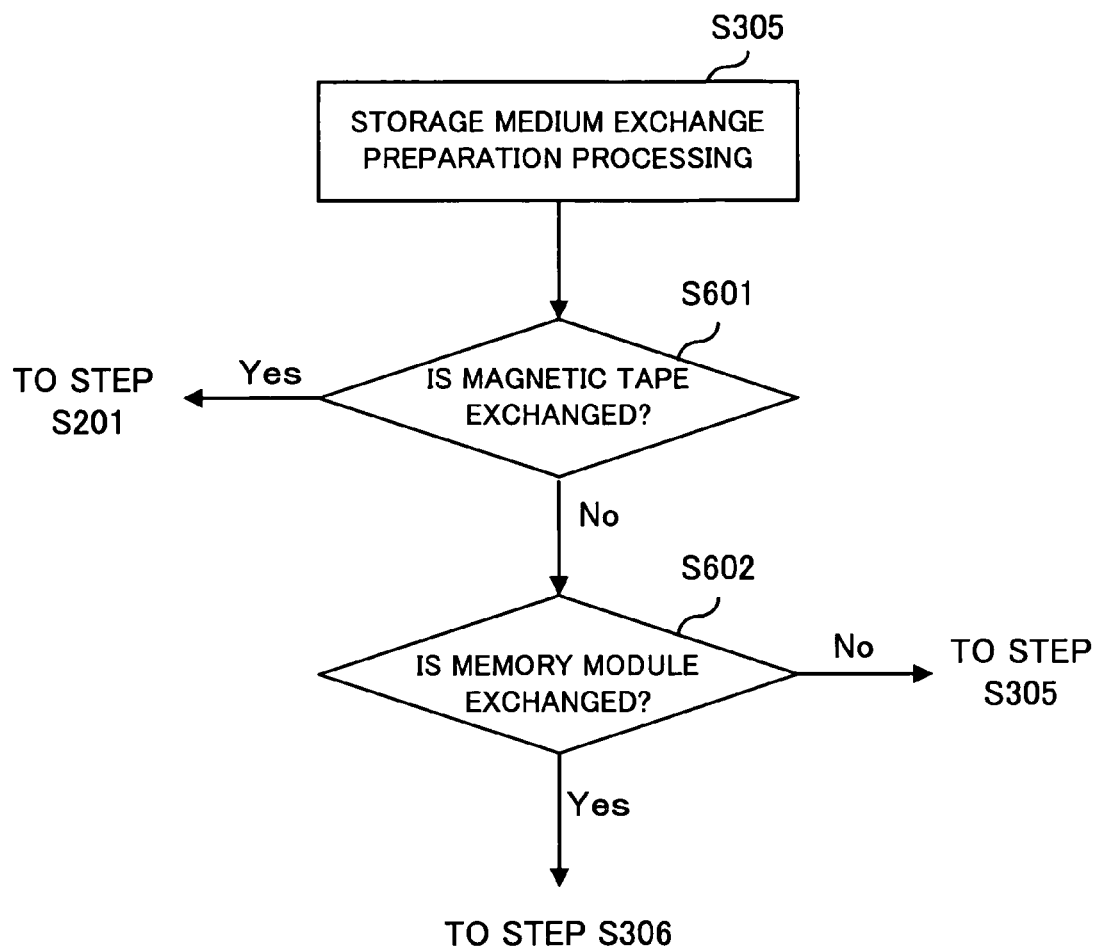
FIG. 8 is a flowchart for explaining a modification of error processing shown in FIG. 4.

As a result of control Wa to Wc, when recognizing that the magnetic tape MT and/or memory module MM is exchanged, the reading control circuit 104a determines which medium is exchanged as shown in FIG. 8 (steps S601, S602).

When the magnetic tape MT is switched (step S601; YES), the writing control circuit 103a returns processing to step S201 and performs control such that data to be backed up is written on the magnetic tape MT. While, when only the memory card MM is switched (step S601; NO, step S602; YES), the writing control circuit proceeds to processing of step S306 and perform control such that data to be backed up is written on the memory module MM. At this time, continuity of address information is ensured.

Most of "failure in processing for backing up data on the magnetic tape MT" is caused by defects in the magnetic tape MT itself. Accordingly, there is high possibility that the backup processing will be continued if the magnetic tape MT is switched. However, if data writing onto the magnetic tape MT cannot be continued because of the defects (solids on the magnetic head, etc.) of magnetic tape apparatus 100, this is detected in step S203 and data is written on the memory module MM in error processing (step S207; FIG. 4).

Moreover, if no exchange for the magnetic tape MT is carried out and the exchange for only the memory module MM is carried out, data is recorded on the memory module MM.

Furthermore, in this case, if the magnetic tape MT is exchanged in step S305 of error processing and data, which follows data recorded on the memory module MM, is written on the magnetic tape MT, the medium on which the following data is recorded is attached to the magnetic tape apparatus 100 in storage medium exchange notice processing of step S412 of FIG. 5.

(2) Second Embodiment

The following will explain a second embodiment of the present invention. The second embodiment corresponds to an embodiment in which the first embodiment is further specified.

Figure 9:
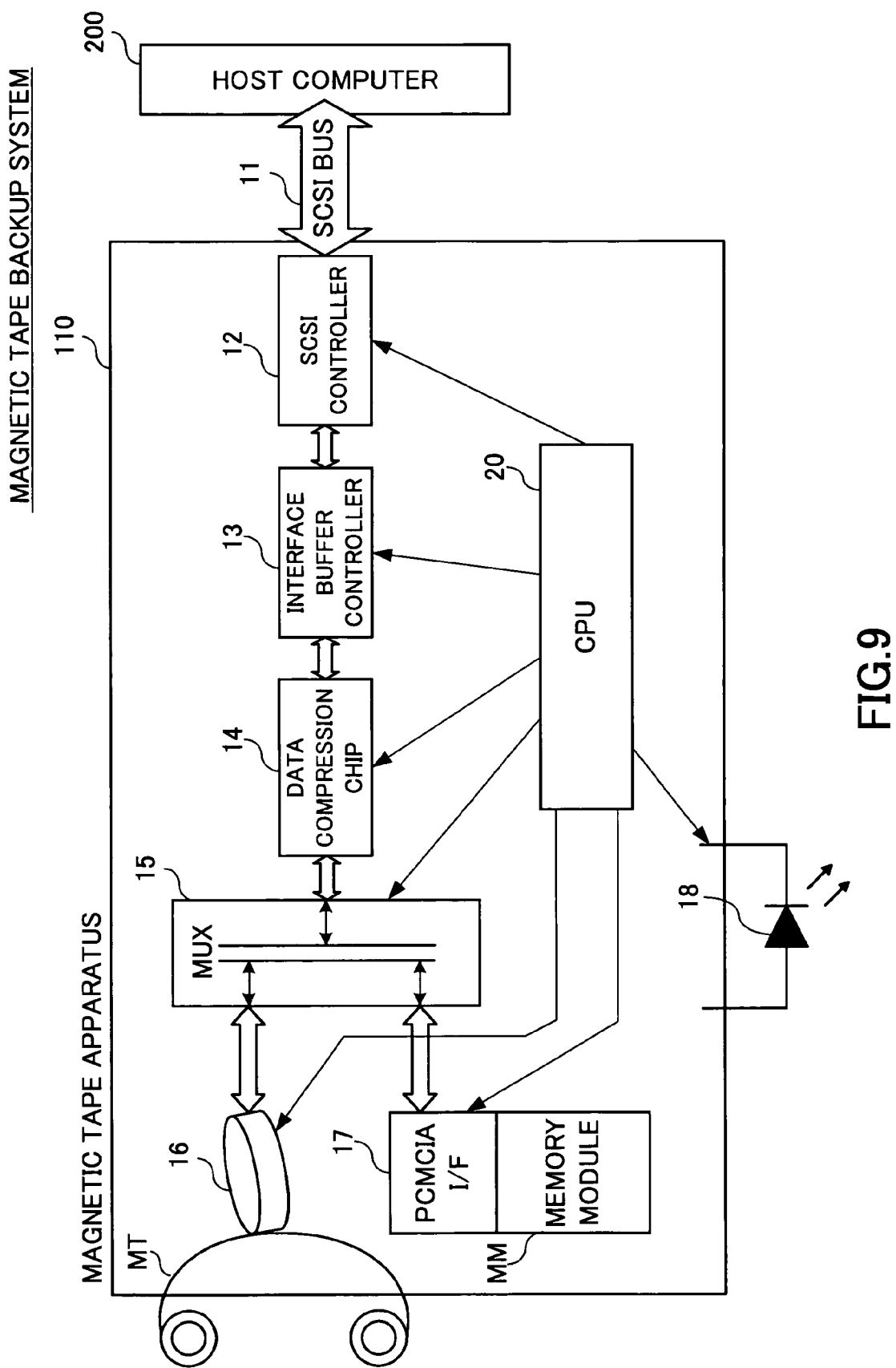
FIG. 9 is a block diagram showing the configuration of a magnetic tape backup system according to a second embodiment of the present invention.

As shown in FIG. 9, the host computer 200 of the backup system of this embodiment includes an SCSI (Small Computer Systems Interface) host adopter, etc. The host computer 200 is connected to a magnetic tape apparatus (backup device) 10 by the SCSI bus 11 (corresponding to bus 300 in FIG. 1).

The magnetic tape apparatus 110 includes an SCSI controller 12, an interface buffer controller 13, a data compression chip 14, a multiplexer 15, a magnetic head drum 16, a PCMCIA (Personal Computer Memory Card International Association) interface 17, an LED (Light Emitting Diode) 18, and a CPU (Central Processing Unit) 20.

The SCSI controller 12 transmits/receives data to/from the host computer 200 via the SCSI bus 11.

The interface buffer controller 13 buffers data.

The data compression chip 14 compresses/decompresses data. Moreover, the data compression chip 14 generates an address of each data under control the CPU 20 and adds generated data to data to be written. The data compression chip 14 further separates address data from reproduced data and provides the results to the CPU 20.

The multiplexer 15 performs a switch between storage media (magnetic tape MT and memory module MM).

The magnetic head drum 16 corresponds to the magnetic head 101 of FIG. 1, and writes data on the magnetic tape MT or reads data recorded on the magnetic tape MT. In addition, there are arranged a transfer mechanism, which transfers a magnetic tape, and a head driver which drives the magnetic head drum 16.

The PCMCIA interface 17 corresponds to the memory interface 102 of FIG. 1, and makes it possible to access the memory module MM including a flash memory card, etc. or attach/detach the memory module MM.

The LED 18 is used to notify the user that attachment/detachment of the magnetic tape MT or memory module MM is possible. The CPU 20 controls the aforementioned structural components.

The writing circuit 103 and reading circuit 104 of the first embodiment can be implemented by the SCSI controller 12, interface buffer controller 13, data compression chip 14, multiplexer 15, LED 18, and CPU 21.

The following will explain the operation of the data backup system according to this embodiment.

An explanation will be first given of processing (data backup processing) at the time of writing data to be backed up.

The SCSI controller 12 provided in the magnetic tape apparatus 110 receives data (data to be backed up) sent from the host computer 200 via the SCSI bus 11 and provides received data to the interface buffer controller 13 based on control of CPU 20.

The interface buffer controller 13 performs buffering on data to be backed up based on control of CPU 20.

The data compression chip 14 reads buffered data, compresses read data, adds header information and address information to compressed data, and provides the resultant to the multiplexer 15 based on control of the CPU 20. In addition, compressed data may be provided to the CPU 20 from the data compression chip 14 and the CPU 20 adds header information and address, and the resultant may be provided to the multiplexer 15.

The multiplexer 15 supplies the corresponding compressed data subjected to processing by the data compression chip 14 to the magnetic head drum 16 based on control of the CPU 20. The magnetic head drum 16 writes supplied compressed data on the magnetic tape MT.

The CPU 20 determines whether there occurs "failure (error) in processing for backing up data on the magnetic tape MT" caused by soils on the magnetic head drum 16 and defects in the magnetic tape MT during the execution of general (normal) data backup processing onto the magnetic tape MT. Namely, the CPU 20 switches the reading/writing from magnetic tape MT to the memory module MM, and determines the presence or absence of necessity to execute data backup processing.

When the CPU 20 determines that there occurs "failure (error) in processing for backing up data on the magnetic tape", the multiplexer 15 switches the storage medium, which is a writing destination for data, from the magnetic tape MT to the memory module MM based on control due to the CPU 20. After that, the multiplexer 15 writes backing up data after occurrence of error (including data that was not able to be written at the error occurrence time) on the memory module MM via the PCMCIA interface 17.

At this time, the CPU 20 performs control such that address information is written on the memory module MM together with data in order to maintain continuity with data on the magnetic tape MT. This address information is information that directly or indirectly shows on which portion of the magnetic tape MT data written on the memory module MM should be written.

Moreover, the CPU 20 always determines (detects) whether a residual writable area in the memory module MM is used up. In other words, the CPU 20 determines whether data is written on the entire area of the memory module MM.

The CPU 20 performs control for exchanging the medium as shown in the following Qa to Qc when determining that data is written on the entire area of the memory module MM.

Qa: Return a check condition in response to SCSI command for writing (WRITE command and WRITE FILEMARKS command) and an error code for End-of-Medium Detected (Sense Key/ASC/ASCQ=00/00/02) in response to a next REQUEST SENSE command to the host computer 200.

Qb: Control the magnetic head drum 16 and PCMCIA interface 17 to make it possible to attach/detach the magnetic tape MT and memory module MM.

Qc: Blink the LED 18 to notify the user that the exchange for the storage medium is possible.

For example, when the magnetic tape MT is switched, the CPU 20 performs control such that data to be backed up is written on the magnetic tape MT. While, when the memory module MM is switched, the CPU 20 performs control such that data to be backed up is written on the memory module MM.

An explanation will be next given of processing (data restoring processing) at the time of reading data to be backed up.

Before executing this processing, the magnetic tape (magnetic tape at the time of generating failure in data backup processing) MT and the memory module (memory module used at the time of generating failure in data backup processing) MM are attached to the normal magnetic tape apparatus 110.

First, the CPU 20 refers to address information of data stored in the memory module MM via the PCMCIA interface 17.

The CPU 20 distinguishes between a portion where data is stored onto the magnetic tape MT and a portion where data is stored onto the memory module MM based on referred address information among all backing up data stored in the magnetic tape MT and memory module MM. Namely, the CPU 20 recognizes "timing at which the storage medium is switched from the magnetic tape MT to the memory module MM" (step S402).

Sequentially, the CPU 20 controls the multiplexer 15 and the magnetic head drum 16 such that data normally written on the portion of the magnetic tape MT is read from the magnetic tape MT.

Data read from the magnetic tape MT by the magnetic head drum 16 is supplied to the data compression chip 14 via the multiplexer 15. The data compression chip 14 provides addresses and header information to the CPU 20. Also, the data compression chip 14 decompresses compressed data and provides decompressed data to the interface buffer controller 13. The interface buffer controller 13 performs buffering on provided data and sends buffered data to the SCSI controller 12. The SCSI controller 12 provides this data to the host computer 200. In addition, reading data may be sent to CPU 20 from the multiplexer 15 and the CPU 20 may separate compressed data therefrom and provide the resultant to the data compression chip 14.

When the timing reaches "timing at which the storage medium is switched from the magnetic tape MT to the memory module MM", the CPU 20 controls the multiplexer 15 and PCMCIA interface 17 such that data to be backed up is read from the memory module MM.

Moreover, in the aforementioned data reading process, the CPU 20 performs control for exchanging the media (magnetic tape and flash memory card) at the data reading time, as well as at the data writing time.

In addition, the memory module is not limited to the flash memory card if three conditions of detachability, writability, nonvolatility are satisfied. For example, media (magnetic disk, etc.) other than "memory module" may be used.

Moreover, "notice that urges the user to perform exchange (switch) between the magnetic tape MT and memory module MM" may be implemented by the method other than "blinking the LED 18 under control of the CPU 20."

(2) Third embodiment

Figure 10:
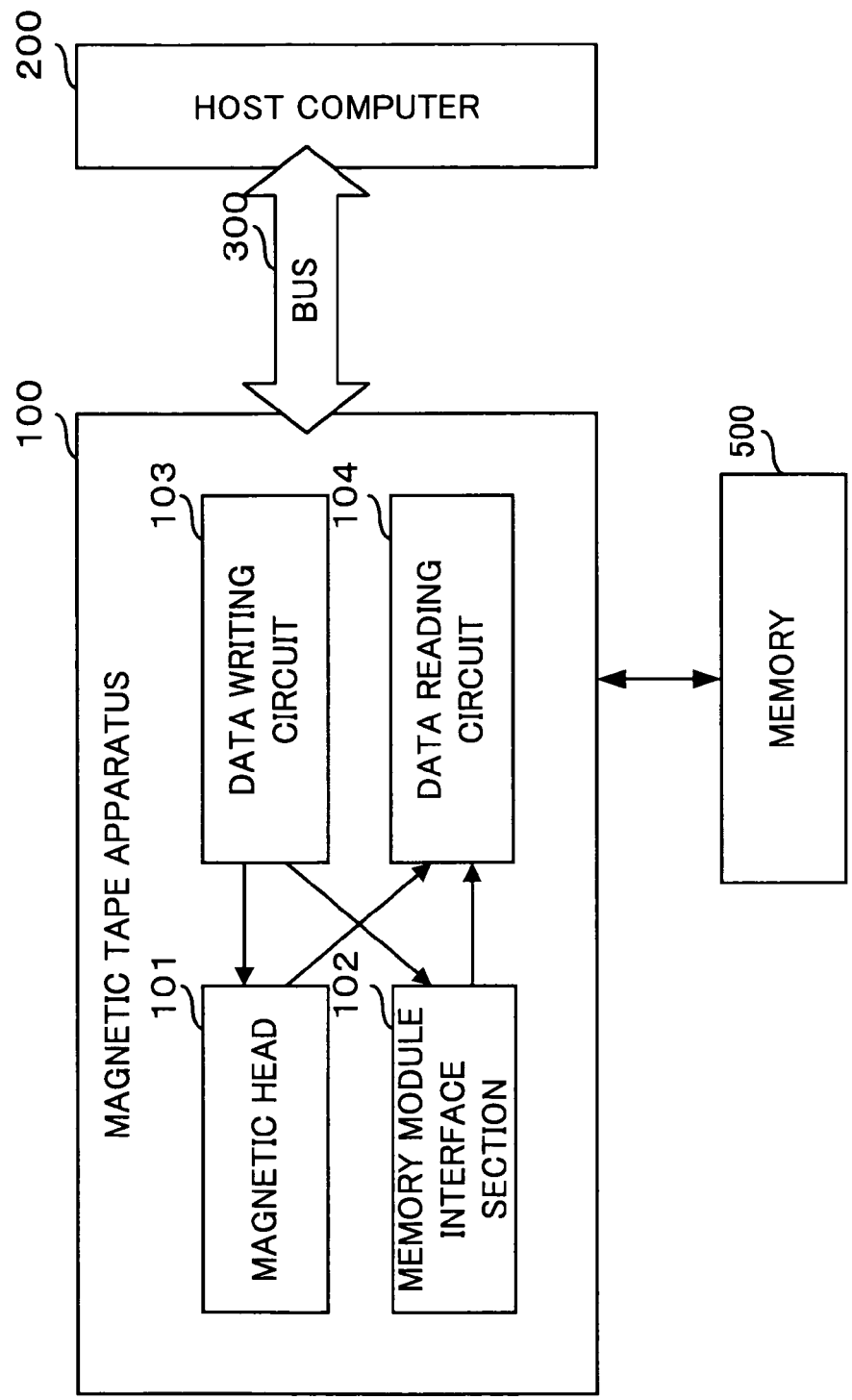
FIG. 10 is a block diagram showing the configuration of a magnetic tape backup system according to a third embodiment of the present invention.

FIG. 10 is a block diagram showing a configuration of a third embodiment of the present invention. As shown in the figure, the third embodiment of the present invention is different from the first embodiment of FIG. 1 in the point that a program memory 500 that stores a data backup control program is provided.

The data backup control program is read out from the program memory 500 into the magnetic tape apparatus 100. Then, the data backup control program controls the operation of the corresponding magnetic tape apparatus 100 as the data writing circuit 103 and data reading circuit 104. The operation of the magnetic tape apparatus 100 (data writing circuit 103 and data reading circuit 104) under control of the data backup control program is exactly the same as the operation of the magnetic tape apparatus 100 of the first embodiment, so that the explanation is omitted.

In addition, this invention is not limited to the aforementioned embodiments and various modifications and applications may be possible. For example, in the aforementioned embodiments, it is determined whether the error occurs at the time of writing data on the magnetic tape by performing the verification operation. However, other arbitrary determination methods may be used. For example, signal strength (magnetic field strength) of data recorded on the magnetic tape may be measured and a writing error may be determined when the strength is lower than a reference level.

In addition, this invention is not limited to the aforementioned embodiments and various modifications and applications may be possible. For example, a format of data, which is recorded on the magnetic tape and memory module or a format of an address, which is added to recorded data is arbitrary used. For example, in the case where data is written on the magnetic tape on a frame or field basis, a field number may be used as an address. In this case, information as an address that indicates which frame or field on the original magnetic tape MT data should be written is written on the memory module MM. Furthermore, in FIG. 7, an address is also added to data that is recorded on the magnetic tape MT. However, for example, an address may be added to only data that is written on the memory module MM.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-383915 filed on Dec. 18, 2001 and including specification, claims, drawings and summary. The disclosure of the above Japanese Patent Application is incorporated herein by reference in its entirety.

What is claimed is:

1. A magnetic tape apparatus that stores data provided from an external device onto a magnetic tape, comprising:

a magnetic tape access device that has a magnetic tape attachably and detachably set thereto, wherein the magnetic tape access device gains access to the set magnetic tape;

a storage medium access device that has a storage medium attachably and detachably set thereto, wherein the storage medium access device gains access to the set storage medium; and a writing circuit that writes data provided from the external device onto the magnetic tape by controlling the magnetic tape access device, wherein when it is determined that data cannot be written onto the magnetic tape, the writing circuit switches a writing destination for the data from the magnetic tape to the storage medium, and writes address information and data following the data written onto the magnetic tape onto the storage medium by controlling the storage medium access device, wherein the address information indicates a position on the magnetic tape where the data should originally be written, and wherein the writing circuit determines that the data cannot be written onto the magnetic tape by:

comparing data written onto the magnetic tape with the data provided from the external device, when the data written onto the magnetic tape does not match the data provided from the external device, re-writing the data onto the magnetic tape, and when no match is obtained after a predetermined number of re-writing by the writing circuit, determining that the data cannot be written onto the magnetic tape, wherein, a reading destination determining circuit determines a timing at which to switch a reading source for data from the magnetic tape to the storage medium by reading the address information of a plurality of data records written on the storage medium before data in first data record of the plurality of data records is read from the magnetic tape or the storage medium; and a reading circuit that reads data from the magnetic tape by controlling said magnetic tape access device, checks after reading a predetermined amount of data, whether the timing determined by the reading destination determining circuit is reached, switches the reading destination for data to the storage medium at the timing determined by said reading destination determining circuit, and continues to read data from the storage medium, wherein the data read from the storage medium follows the data read from the magnetic tape, and wherein the writing circuit receives data written on the magnetic tape from the reading circuit.

2. The magnetic tape apparatus according to claim 1, wherein when it is determined that data cannot be written onto the magnetic tape, said writing circuit switches the writing destination for the data from the magnetic tape to the storage medium regardless of a remaining amount of the magnetic tape.

3. The magnetic tape apparatus according to claim 1, wherein the writing circuit executes multiple rewritings of data.

4. The magnetic tape apparatus according to claim 1, wherein said writing device determines presence or absence of remaining writable area of the storage medium during data writing onto the storage medium, and urges a user to change the attached magnetic tape or the attached storage medium for a new magnetic tape or a new storage medium when the absence of writable area is determined, wherein the storage medium is a backup storage to which the data is written in an event of failure of the magnetic tape.

5. The magnetic tape apparatus according to claim 1, wherein said reading device determines whether data is read from entire readable area of the storage medium during data reading from the storage medium, and wherein when the reading device determines that the data is read from the entire readable area, the reading device urges a user to change the attached magnetic tape or the attached storage medium for a new magnetic tape or a new storage medium on which data following the read data is written.

6. The magnetic tape apparatus according to claim 1, wherein said magnetic tape access device comprises a magnetic head, and wherein the storage medium comprises a memory module, and said storage medium access device comprises an interface circuit to which the memory module is attached.

7. The magnetic tape apparatus according to claim 1, wherein said writing circuit generates writing data with a predetermined format, and wherein said writing circuit assigns an address to each data unit, and provides the assigned address to said magnetic tape access device and said storage medium access device.

8. The magnetic tape apparatus according to claim 1, wherein each of said writing circuit and said reading circuit comprises a communication interface, a buffer, and a compression circuit, wherein a writing operation comprises:
receiving by the communication interface data provided from the external device, storing the received data in the buffer,
compressing by the compression circuit data stored in the buffer, and
providing the compressed data to said magnetic tape access device and said storage access device, and wherein a reading operation comprises:
decompressing by the compression circuit data read from said magnetic tape access device and said storage medium access device,
storing the decompressed data in the buffer,
reading the stored data from the buffer, and
providing the read data to the external device.

9. The magnetic tape apparatus according to claim 1, wherein the magnetic tape access device is an interface configured to gain access only to the set magnetic tape, wherein the storage medium access device is an interface configured to gain access only to the set storage medium, wherein the storage medium is a flash card and wherein the storage medium is a separate medium from the magnetic tape.

10. The magnetic tape apparatus according to claim 1, wherein the writing circuit comprises a receiving buffer that stores data from the external device and a writing buffer that stores data for said writing, said data is data received from the receiving buffer and processed by the writing circuit.

11. The magnetic tape apparatus according to claim 1, wherein the writing circuit comprises a buffer storing the data from the external device.

12. The magnetic tape apparatus according to claim 11, wherein the writing circuit adds an identifier to the data read from the external device prior to the storing of the data in the buffer and wherein the writing circuit comprises a compression unit for compressing the data from the external device prior to the storing of the data in the buffer.

13. The magnetic tape according to claim 11, wherein the determination that the data cannot be written onto the magnetic tape is made by having the writing circuit request a reading circuit to read a previously recorded data unit from the magnetic tape and transmit the read data to the writing circuit, and the writing circuit compare the read data with data stored in the buffer.

14. A magnetic tape reproduction device that reproduces a series of data from a magnetic tape and a storage medium on which data that follows data recorded on the magnetic tape is recorded, comprising:

a magnetic tape access device that has a magnetic tape attachably and detachably set thereto, wherein the magnetic tape access device gains access to the set magnetic tape;

a storage medium access device that has a storage medium attachably and detachably set thereto, wherein the storage medium access device gains access to the set storage medium;

a reading destination determining circuit that determines timing at which to switch a reading source for data from the magnetic tape to the storage medium by reading address information of a plurality of data records written on the storage medium before data in first data record of the plurality of data records is read from the magnetic tape or the storage medium; and a reading circuit that reads data from the magnetic tape by controlling said magnetic tape access device, checks after reading a predetermined amount of data, whether the timing determined by the reading destination determining circuit is reached, switches the reading destination for data to the storage medium at the timing determined by said reading destination determining circuit, and reads data that follows the data read from the magnetic tape from the storage medium by controlling said storage medium access device, wherein the reading circuit reads data from the magnetic tape based on instruction from a writing circuit that writes data provided from the external device onto the magnetic tape and onto the storage medium when the data cannot be written onto the magnetic tape, and wherein the reading circuit transmits the read data to the writing circuit for comparison to original data.

15. A magnetic tape apparatus that stores data provided from an external device onto a magnetic tape, comprising:

magnetic tape access means for having a magnetic tape attachably and detachably set thereto and for gaining access to the set magnetic tape;

storage medium access means for having a storage medium attachably and detachably set thereto and for gaining access to the set storage medium; and a writing circuit that writes data provided from the external device onto the magnetic tape by controlling said magnetic tape access means, wherein when data cannot be written on the magnetic tape, the writing circuit switches a writing destination from the magnetic tape to the storage medium, and writes address information and data following the data written onto the magnetic tape, onto the storage medium by controlling said storage medium access means, wherein the address information indicates a position on the magnetic tape where writing data should originally be written, and wherein the writing circuit determines that the data cannot be written onto the magnetic tape by:
comparing data written onto the magnetic tape with the data provided from the external device,
when the data written onto the magnetic tape does not match the data provided from the external device, re-writing the data onto the magnetic tape, and
when no match is obtained after a predetermined number of re-writing by the writing circuit, determining that the data cannot be written onto the magnetic tape, reading destination determining means for determining a timing at which to switch a reading source from the magnetic tape to the storage medium by reading the address information of a plurality of data records written on the storage medium before data in first data record of the plurality of data records is read from the magnetic tape and the storage medium set to said magnetic tape access means and said storage medium access means, respectively; and reading means for reading data from the magnetic tape by controlling said magnetic tape access means, for checking after reading a predetermined amount of data, whether the timing determined by the reading destination determining means is reached, for switching the reading destination for data to the storage medium at the timing determined by said reading destination determining means, and reading from the storage medium data following the data read from the magnetic tape, and wherein the writing circuit receives data written on the magnetic tape from the reading means.

16. A magnetic tape reproduction device that stores data provided from an external device onto a magnetic tape, comprising:

magnetic tape access means for having a magnetic tape attachably and detachably set thereto and for gaining access to the set magnetic tape;

storage medium access means for having a storage medium attachably and detachably set thereto and for gaining access to the set storage medium;

reading destination determining means for determining a timing at which to switch a reading source for data from the magnetic tape to the storage medium by reading address information of a plurality of data records written on the storage medium before data in first data record of the plurality of data records is read from the magnetic tape or the storage medium;

reading means for reading data from the magnetic tape by controlling said magnetic tape access means, for checking after reading a predetermined amount of data, whether the timing determined by the reading destination determining means is reached, for switching the reading destination for data to the storage medium at the timing determined by said reading destination determining means, and for reading from the storage medium data following the data read from the magnetic tape by controlling said storage medium access means, wherein the reading circuit reads data from the magnetic tape based on instruction from a writing circuit that writes data provided from the external device onto the magnetic tape and onto the storage medium when the data cannot be written onto the magnetic tape, and wherein the reading circuit transmits the read data to the writing circuit for comparison to original data.

17. A data backup method comprising:

sequentially writing data onto a magnetic tape; and wherein, when data cannot be written onto the magnetic tape, switching a writing destination for the data from the magnetic tape to a storage medium and writing address information, together with writing onto the storage medium data following the data written on the magnetic tape, wherein the address information indicates a position on the magnetic tape where writing data should originally be written, and wherein said writing operation comprises:
receiving data from an external device,
storing the received data in a buffer,
compressing the stored data, and
providing the compressed data to said magnetic tape access device and said storage access device, wherein the determining that data cannot be written onto the magnetic tape comprises:
comparing data written onto the magnetic tape with the data provided from the external device,
when the data written onto the magnetic tape does not match the data provided from the external device, re-writing the data onto the magnetic tape, and
when no match is obtained after a predetermined number of re-writing, determining that data cannot be written onto the magnetic tape, determining a timing at which to switch a reading source for data from the magnetic tape to the storage medium by reading the address information of a plurality of data records written on the storage medium before data in first data record of the plurality of data records is read from the magnetic tape or the storage medium;

reading data from the magnetic tape;

checking after the reading a predetermined amount of data whether the determined timing is reached;

switching the reading source for data at the determined timing; and reading from the storage medium data following the data read from the magnetic tape, and wherein a reading circuit that reads the data transmits to a writing circuit that sequentially writes the data, the read data for comparison to original data.

18. The data backup method according to claim 17, wherein said reading operation comprises:

decompressing data read from said magnetic tape and said storage medium, storing the decompressed data in a buffer, reading the stored data from the buffer, and providing the read data to an external device.

19. A backup data reproduction method for reproducing a series of data divisionally recorded on a magnetic tape and another storage medium, comprising:

determining a timing at which to switch a reading source for data from the magnetic tape to the storage medium by reading address information of a plurality of data records written on the storage medium before data in first data record of the plurality of data records is read from the magnetic tape or the storage medium; and reading data from the magnetic tape;

checking after the reading a predetermined amount of data whether the timing is reached;

switching the reading source for data at the determined timing; and reading from the storage medium data following the data read from the magnetic tape, wherein the reading operation comprises:

decompressing data read from said magnetic tape and said storage medium, storing the decompressed data in a buffer, reading the stored data from the buffer, and providing the read data to the external device, wherein the reading circuit reads data from the magnetic tape based on instruction from a writing circuit that writes data provided from the external device onto the magnetic tape and onto the storage medium when the data cannot be written onto the magnetic tape, and wherein the reading circuit transmits the read data to the writing circuit for comparison with original data.

* * * * *